Figure 1:
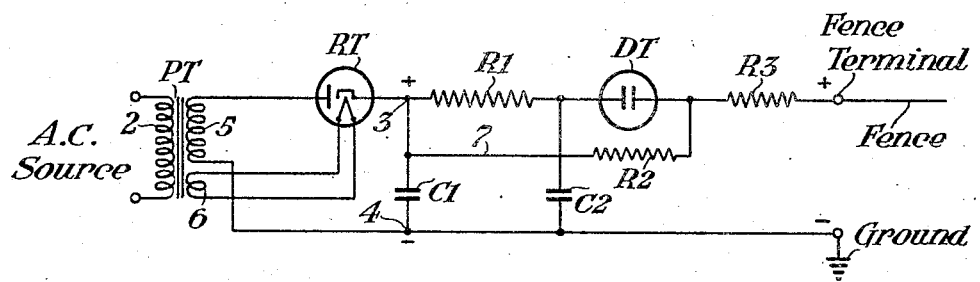

Nov. 2, 1943.                    N. F. AGNEW                         2,333,224
                       ELECTRICAL FENCE CHARGING APPARATUS
                              Filed March 21, 1941

INVENTOR
Norman F. Agnew
BY
Paul S. Johnson
HIS ATTORNEY

Patented Nov. 2, 1943

2,333,224

UNITED STATES PATENT OFFICE 2,333,224

ELECTRICAL FENCE CHARGING APPARATUS

Norman F. Agnew, Wilkinsburg, Pa.

Application March 21, 1941, Serial No. 384,504

6 Claims. (Cl. 256—10)

My invention relates to electrical fence charging apparatus and more particularly to apparatus of this type which uses no moving parts and which is normally inactive but becomes active to deliver a shock output when animal contact is established between the fence wire and ground.

An important object of my invention is to provide an electric fence controller capable not only of delivering a highly effective shocking current but also a constantly effective weed killing output which reduces the leakage current to ground to a minimum, thus maintaining the fence at peak efficiency and permitting operation of considerably longer fences. Another object of my invention is to provide the above operation with a circuit of unusual simplicity requiring only a small number of parts, these being of relatively rugged and simple construction for increasing the safety, reliability, and operating life of the apparatus. A further object of my invention is to provide a fence controller which meets all of the safety requirements of recognized regulatory bodies in this field and which is incapable of delivering a dangerous output under the condition of a short or open circuit in those portions of the apparatus where such failure can possibly occur. A still further object of my invention is to provide apparatus in which the shock output adjusts itself automatically in accordance with the grounding resistance through an animal which contacts the fence, the shocking potential being stronger in dry weather when the resistance is high and less strong in wet weather when the resistance is low and a weaker potential suffices. Other objects, advantages and characteristic features of the apparatus will become apparent as the description progresses.

I accomplish the foregoing objects by a novel circuit arrangement employing a glow discharge tube through which the energy stored in a condenser is at times discharged, the circuit being so arranged that normally, when the fence is free, an insufficient potential difference exists across the tube so that no discharge results, whereas when the fence is contacted, a sufficient resultant potential appears across the tube and causes breakdown and a shock discharge. When the fence is completely grounded, the minimum potential as determined by the tube breakdown characteristic appears across the tube and the highest rate of flashing with a vivid glow in the tube is then effective. A sufficient initial bias of proper polarity for weed killing purposes is constantly impressed between the fence and ground to free the fence of contact by weeds, thus maintaining the fence at high efficiency even in difficult areas where weed growth is abundant. An important feature of my invention is the dual function served by this bias potential which not only frees the fence of leakage due to weeds but provides the opposing potential which normally prevents shock discharge unless the fence is contacted and which automatically adjusts the strength of the discharge in accordance with the nature of the contact which is established through the animal to ground.

My present invention is an improvement on the apparatus disclosed in the copending United States application Serial No. 277,676 filed on June 6, 1939, by N. F. Agnew and W. P. Place, for Electrical fence charging apparatus, now Patent No. 2,258,669 issued October 14, 1941.

I shall describe two forms of apparatus embodying my invention and shall then point out the novel features thereof in claims.

Figure 2:
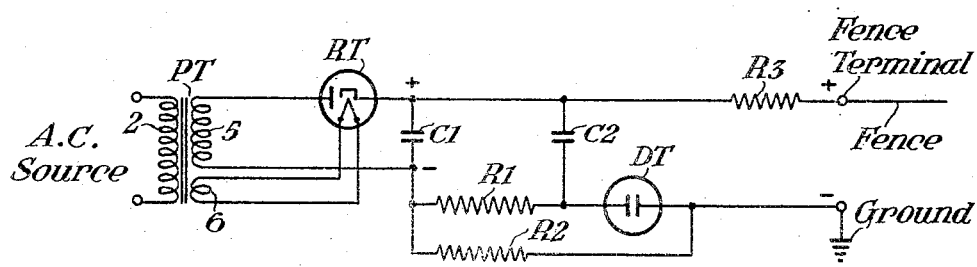
Figure 4:
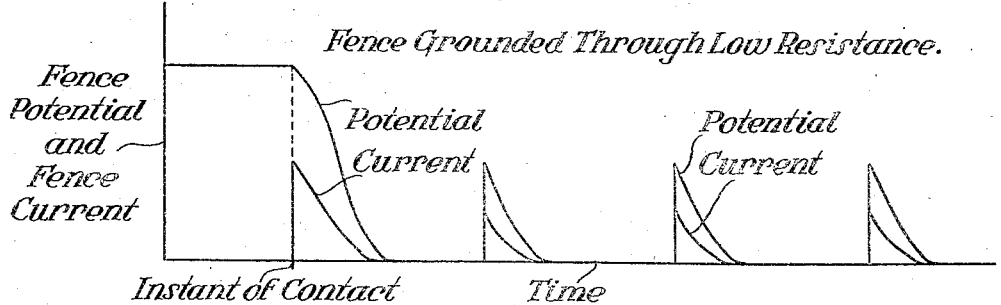
Figure 3:
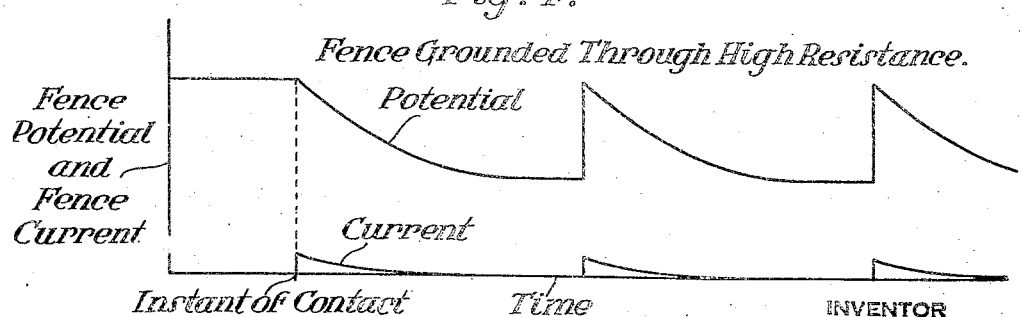

In the accompanying drawing, Fig. 1 is a diagrammatic view showing one form of electrical fence charging apparatus embodying my invention. Fig. 2 is a diagrammatic view showing a modified form of the apparatus of Fig. 1, also embodying my invention. Figs. 3 and 4 are illustrative voltage and current curves showing the shock output of the apparatus of Fig. 1 or 2 under certain conditions of resistance between the fence and ground.

An outstanding difficulty in the art of electric fencing is the provision of a powerful, yet safe fence controller which does not lose its output when connected to a relatively long, leaky fence. There are available numerous fence controllers which operate satisfactorily under favorable conditions such as high insulation resistance of the fence but which lose their effectiveness under adverse weather conditions or in the presence of weed growth. Such controllers are unreliable because if an animal discovers once that the fence is not dangerous, the training habit is broken and the animal may break through the fence notwithstanding the presence of an effective shock at that particular time. In addition to remaining effective under adverse weather conditions, the controller embodying my invention combines the features of automatic shock adjustment, delivery of shock only upon contact with the fence, and provision of a weed killing output, all in an extremely simple and thoroughly safe circuit which eliminates all moving parts and is comparatively inexpensive to manufacture. Notwithstanding its comparatively low cost and inherent safety, the novel circuit herein disclosed has proved on test and in actual service to remain reliably effective under stringent operating conditions, its trouble-free life being determined entirely by the life of the rectifier and discharge tubes which are standard, commercial devices having a warranted life of several years. The fact that the discharge tube is used only when the fence is contacted or grounded obviously extends the life of this tube.

It has been found that in the range of currents of the order of a few milliamperes such as are suitable for fence charging purposes, an alternating current shock is more likely to be dangerous, other factors being equal, than a shock which consists substantially of unidirectional current. As a matter of fact, the unidirectional current can be many times as strong, before the same degree of danger is present. For this reason, the maximum permissible alternating output of an approved fence controller is substantially below that permitted in the case of a controller which delivers a unidirectional shock current. Of course, the duration of the shock must in each case be properly controlled.

With the above and other important considerations in mind, I have embodied my novel circuit arrangement in a controller which delivers a substantially unidirectional output utilizing thereby to full advantage the weed killing potential as a factor in raising the peak shock output to its maximum value, as determined by the output capacity and current limiting features of the apparatus.

Referring now to Fig. 1 of the drawing, the power transformer PT has its primary winding 2 connected to a suitable source of alternating current and supplies a rectified potential of the required magnitude across the terminals 3—4 from its secondary winding 5 and rectifier tube RT. The filament winding 6 energizes the tube filament, and the condenser C1 raises the peak potential effective across the terminals 3—4 in well-known manner. This potential charges the discharge condenser C2 through the charging resistor R1 so that normally when the fence is free the potential across C2 is substantially the same as across the terminals 3—4, until the fence is contacted and a discharge takes place through the discharge tube DT. The constantly effective weed killing potential or bias is applied from the positive termianl 3, over wire 7 and resistors R2 and R3 to the fence, returning to ground and to the negative terminal 4 through any vegetation that may be in contact with the fence. The resistor R3 is merely a protective resistor but the resistor R2 serves the important purpose of providing an opposing potential or bias on the cathode of the discharge tube which thereby provides certain of the novel features of my apparatus.

The operation of the apparatus may be described as follows. With no appreciable leakage from the fence to ground, the anode and cathode of the tube DT are at substantially the same potential so that no discharge takes place and the only output delivered by the controller is the weed killing current. When the fence is contacted by an animal, the cathode voltage is reduced because of the voltage drop in resistor R2 caused by the initial current taken by the animal. A sufficient potential difference now appears across the two electrodes of the tube DT so that the tube breaks down and the fully charged condenser C2 discharges through the animal. The breakdown potential of the tube is such that a relatively high resistance between the fence and ground is adequate for unbalancing the tube potential sufficiently to cause breakdown and a shock discharge. Following the first discharge, the condenser C2 will immediately become recharged, whereupon succeeding shocks will be administered periodically until the animal breaks contact. Once the fence is free, the discharge will cease, only to reappear upon subsequent contact with the fence.

Although the first discharge occurs immediately upon contact with the fence, the rate at which the shock discharges recur depends on the value of the resistance from the fence to ground. If the resistance is high, the rate of discharge is less rapid than when the resistance is low. In the former case, the accompanying glow is scarcely perceptible. When the fence is grounded, however, the rate of discharge is greatest and the flashing of the tube is very noticeable and vivid in color so that an inherent indication of the grounded condition of the fence is provided by the apparatus.

It will be observed that under the condition of high resistance, as for example in dry weather, the condenser C2 becomes charged to substantially the full potential existing between terminals 3—4 so that the resulting shock discharge is correspondingly greater. In wet weather when a lower shock potential is required, the resistance from fence to ground will ordinarily be lower and under this condition the condenser C2 will charge to a potential somewhat lower so that a correspondingly lower shock potential will appear on the fence. Accordingly, regulation of the shock potential with weather conditions is automatically obtained in my apparatus, the shock current being maintained at its effective value under these different operating conditions. This automatic regulation can perhaps be more easily understood by assuming, for purposes of illustration only, that the potential across the terminals 3—4 is 600 volts; that the breakdown potential of the tube DT is 300 volts; and that a resistance of 100,000 ohms is just sufficient to cause a discharge of the tube in dry weather. This means that in dry weather, the relatively high resistance of 100,000 ohms from fence to ground will cause a drop of 300 volts in resistor R2 so that the resultant potential across the tube is 300 volts and tube breakdown occurs. Assuming now a short-circuit from the fence to ground (to simulate the wet weather condition) the cathode of the tube will now be at substantially zero potential (neglecting the drop in resistor R3) and under this condition the condenser C2 can become charged only to a potential of 300 volts before tube breakdown occurs, so that a lower shock potential is delivered. For intermediate values of resistance from the fence to ground, intermediate values of shock potential will be effective.

The operation of the apparatus can also be more clearly understood with reference to the voltage and current diagrams of Figs. 3 and 4. Looking first at Fig. 3 in which is illustrated the condition of grounding through 100,000 ohms, it will be observed that up to the instant of contact, the initial fence or cathode potential is at its peak value, assumed for example to be 600 volts. Upon contact, a shock discharge from the condenser C2 into the fence takes place immediately, the shock current decreasing gradually, as indicated in the current curve. The cathode potential will fall to about 300 volts. Accordingly, as soon as the condenser C2 charges to a value 300 volts higher (as required by the tube breakdown characteristic) that is, to 600 volts, the tube will again break down and a discharge take place. Subsequent discharges will recur periodically as long as fence contact continues, the shock potential being 600 volts under the assumed dry weather condition.

If now a perfectly insulated fence is grounded through a very low resistance, the condition illustrated in Fig. 4 will be obtained. Since the fence is assumed to be well insulated, the full potential of 600 volts is assumed to be initially present on the fence. (In practice, the full potential of 600 volts will not be obtainable during wet weather because of unavoidable leakage from fence to ground under this condition.) Thus, when contact is first made, the first shock will be substantially more severe than succeeding shocks, as will be clear from the figure, due to the initial high potential. After the initial condenser charge is dissipated, since the cathode will now be at substantially zero potential, the condenser C2 will charge to about 300 volts when the next discharge will occur, the second and succeeding shocks being correspondingly smaller. These shocks will occur periodically, as in Fig. 3, as long as contact persists but will be substantially more frequent than in the latter figure, and the tube glow will be substantially brighter. One important advantage resulting from the apparatus herein disclosed is that the heavy initial shock is in the great majority of cases sufficient to stop the animal from leaving the enclosure but should the animal become accidentally entangled in the fence, succeeding shocks are less severe so that there is less likelihood of injury.

Figures 3 and 4 are intended to show somewhat extreme conditions of operation. More frequently, the grounding resistance will have some intermediate value between 100,000 ohms and zero, in which case the shock potential will automatically adjust itself to some value between 600 and 300 volts in periodic operation, although, as pointed out above, the initial shock with a perfectly insulated fence may well be 600 volts regardless of the grounding resistance. These voltage values as well as the specific form and magnitude of the potential and current curves shown in Figs. 3 and 4 are not in any manner intended to be rigorous, being used for illustrative purposes only in order to make the disclosure entirely clear. Obviously, for different conditions of operation, different values and electrical constants would be required. However, based on oscillographic observation of the shock output of the apparatus under varying conditions of grounding, the general features of the output as illustrated in Figs. 3 and 4 are believed to be correct.

In each of Figs. 3 and 4 there will be present at all times a certain residual current which flows over the resistors R2 and R3 and which results from the application of the weed killing bias to the fence. This weed killing current is quite small in comparison with the shock output and has not been shown in Figs. 3 and 4 for purposes of simplicity.

As an example of one illustrative set of values which can be used to provide satisfactory operation of the apparatus of Fig. 1, the transformer PT may be a step-up transformer delivering about 450 volts from its secondary winding 5 which, in combination with the commercial (1V type) rectifier tube RT and condenser C1 of approximately 0.25 microfarad capacity, provides a unidirectional potential of the order of 600 volts across the terminals 3—4. The condenser C2 may have a capacity of about 5 microfarads and be charged over a resistance R1 of about 200,000 ohms. The resistors R3 and R2 may have values of about 3,000 and 100,000 ohms, respectively, and the discharge tube DT may be a commercial cold cathode tube designated as 0A4G having a breakdown potential of about 300 volts and a tube drop of about 70 volts. With values such as above, application of a resistance of about 100,000 ohms from fence to ground will produce the required voltage differential of about 300 volts across the discharge tube which causes the tube to break down and to release the condenser discharge to the fence. Since the animal resistance is ordinarily much lower than 100,000 ohms, an effective shock output will be delivered whenever an animal contacts the fence. All of these values are, of course, merely illustrative of one operative embodiment of my apparatus presented to aid an understanding of the operation but these values are not intended to limit the scope of the invention in any way because they are obviously susceptible of wide variation and are adaptable to suit particular operating requirements. If a relatively high potential direct current source is available, the rectifier tube and condenser C1 may be dispensed with. Also, any suitable discharge tube other than the two element cold cathode type shown herein may be used.

The resistors R1, R2, and R3 are mechanically so designed and arranged that a short-circuit between terminals is practically impossible. An open circuit in resistor R3 will disconnect all potential from the fence whereas an open circuit in resistor R1 will disconnect the discharge tube, leaving only the weed killing potential on the fence. An open circuit in resistor R2 will remove the weed killing potential, leaving the fence otherwise effective for shock purposes when contacted by an animal, but without the automatic compensation of the shock potential in accordance with weather conditions except insofar as the rate of discharge is affected by the grounding resistance on the fence. A short-circuit on condenser C1 removes the output completely, whereas a short-circuit on either the condenser C2 or the discharge tube removes or reduces the shock output. It is apparent, therefore, that the apparatus is inherently safe against any of the sources of failure likely to result in apparatus of this character.

Referring now to Fig. 2, the apparatus shown in this figure is quite similar to that of Fig. 1, except that the discharge tube, condenser C2, and resistors R1 and R2 are all connected in the negative lead of the apparatus rather than in the positive lead, as in Fig. 1. Obviously, from the standpoint of operation, the precise location of this apparatus in the circuit is immaterial and other obvious rearrangements of the apparatus of Fig. 1 could be made, the important consideration being the provision of an opposing potential on the tube DT with the fence terminal normally maintained at a positive potential with respect to ground for weed killing purposes. Since the operation of the apparatus of Fig. 2 is identical with that described for Fig. 1, this operation will be entirely clear from the previous discussion so that further description is unnecessary.

It will be apparent from the foregoing that I have provided novel fence charging apparatus incorporating a high degree of safety as well as effectiveness and comprising rugged elements combined in a novel manner in a simple circuit which requires very little power and a minimum of maintenance. Moreover, the novel circuit though simple, includes automatic removal of weed grounds on the fence by a weed killing output or bias of the proper polarity and current strength for this purpose, as well as automatic regulation of the shock potential with weather conditions, delivery of a high initial shock upon contact, and an automatic indication of a ground on the fence.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. Fence charging apparatus comprising, in combination, a source of unidirectional current, a charging resistor, a shock administering condenser connected across the fence-ground path and energized from said source through said charging resistor, a discharge device having its two shock discharge electrodes connected between said condenser and said path whereby a periodic discharge from said condenser into said path through said device will occur when the fence becomes grounded, and a current limiting circuit around said two shock electrodes of the discharge device for providing a path for the flow of weed-killing current from said source and for equalizing the potential on said two electrodes sufficiently to prevent a discharge therethrough when the fence is ungrounded.

2. Fence charging apparatus comprising, in combination, a source of unidirectional current, a charging resistor, a shock administering condenser connected across the fence-ground path and energized from said source through said charging resistor, a discharge device having its two shock discharge electrodes connected between said condenser and said path whereby a periodic discharge from said condenser into said path through said device will occur when the fence becomes grounded, and a resistor connected around said two shock electrodes of the discharge device for providing a path for the flow of weed-killing current from said source and for equalizing the potential on said two electrodes sufficiently to prevent a discharge therethrough when the fence is ungrounded.

3. Fence charging apparatus comprising, in combination, a source of current, a charging resistor, a shock administering condenser connected across the fence-ground path and energized from said source through said charging resistor, a discharge device having its two shock discharge electrodes connected between said condenser and said path whereby a periodic discharge from said condenser into said path through said device will occur when the fence becomes grounded, and a resistor connected around said two shock electrodes of the discharge device for equalizing the potential on said two electrodes sufficiently to prevent a discharge therethrough when the fence is ungrounded.

4. Fence charging apparatus comprising, in combination, a source of unidirectional current, a charging resistor, a shock administering condenser connected across the fence-ground path and energized from said source through said charging resistor in a direction to render the relative polarity of the fence positive with respect to ground, a discharge device having its two shock discharge electrodes connected between said condenser and said path whereby a discharge from said condenser into said path through said device will occur when the fence becomes grounded, and a resistor connected around said two shock electrodes of the discharge device for providing a path for the flow of weed-killing current from said source and for equalizing the potential on said two electrodes sufficiently to prevent a discharge therethrough when the fence is ungrounded.

5. Fence charging apparatus comprising, in combination, a source of unidirectional current, a shock administering condenser connected across the fence-ground path and energized from said source in a direction to render the relative polarity of the fence positive with respect to ground, a discharge device having its two shock discharge electrodes connected between said condenser and said path whereby a discharge from said condenser into said path through said device will occur when the fence becomes grounded, and a resistor connected around said two shock electrodes of the discharge device for providing a path for the flow of weed-killing current from said source.

6. Fence charging apparatus comprising, in combination, a source of unidirectional current, a shock administering condenser connected across the fence-ground path and energized from said source, a discharge device having its two shock discharge electrodes connected between said condenser and said path whereby a discharge from said condenser into said path through said device will occur when the fence becomes grounded, and a resistor having an ohmic value of the order of the grounding resistance through an animal connected around said two shock electrodes of the discharge device for preventing a discharge therethrough when the fence is ungrounded.

NORMAN F. AGNEW.